No. 613,147. Patented Oct. 25, 1898.
A. E. B. HILL.
LEVELING ROD.
(Application filed June 29, 1897.)
(No Model.)

Witnesses:
Inventor:
Arthur E. B. Hill

UNITED STATES PATENT OFFICE.

ARTHUR EDMUND BRETON HILL, OF NEW WESTMINSTER, CANADA.

LEVELING-ROD.

SPECIFICATION forming part of Letters Patent No. 613,147, dated October 25, 1898.

Application filed June 29, 1897. Serial No. 642,808. (No model.)

*To all whom it may concern:*

Be it known that I, ARTHUR EDMUND BRETON HILL, civil engineer, of the city of New Westminster, Province of British Columbia, Dominion of Canada, have invented a new and useful Improvement in Leveling-Rods, such as are ordinarily used by civil engineers, which improvement is fully set forth in the following specification, reference being had to the accompanying drawings.

Figure 2:
Figure 3:
Figure 1:
Figure 4:
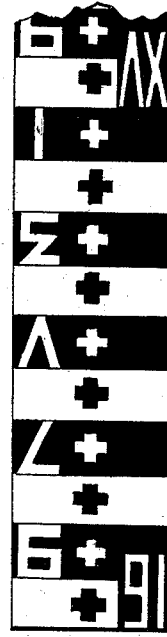

Figure 1 on the drawings represents a portion of the foot or zero end of the face of the rod; Fig. 2, a portion of the top of the face of the rod; Fig. 3, portion of the top or zero end of the back or side of the rod, and Fig. 4 a portion of the foot or highest reading of the back or side of the rod.

The object of my invention is to afford by my new graduation to any engineer engaged in the operation of leveling an infallible check upon the correctness of his rod-readings with greater facility than is afforded by any other means known to me. The novelty of the said new graduation appears in (*a*) the exhibition upon the back or side or half-face of the rod of a graduated scale inverted in position with respect to the scale shown upon the face and so that zero of either scale shall coincide in respect of altitude with the highest reading of the other scale, and also in (*b*) the adoption of a conspicuously different and distinctive ground of color and design of subdivision of the scale to distinguish the one scale from the other scale on the rod—as, for example, black figures on a white ground for the one scale and white figures on a black ground for the other scale.

In using the rod so graduated the reading of the one scale is to be observed and recorded in the usual way, and if the leveler desires to check his reading he signals the rodman to reverse, whereupon the rodman turns the rod around upon its foot, so as to present the other scale to the leveler, who takes and records the reading of the second scale, which I term the "complementary" reading. Where the two scales are on the one face of the rod, it will not be necessary to turn the rod before taking the reading of the second scale. This complementary reading affords an infallible check upon the correctness of the face-reading previously taken, the sum of the readings of the two scales of the rod amounting, if correctly taken, to the length of the rod.

By the use of this rod the leveler has the advantage of having virtually two rods in the hands of the rodman, the one rod with respect of the other inverted at the same time on the same point, and thus there is afforded to him in leveling a greater degree of facility in checking his work by complementary readings than is attainable in using an ordinary rod without complementary graduation.

I claim as my invention—

1. A leveling-rod having upon two of its faces (or sides) two fixed and immovable graduated scales, inverted in position with respect to each other, and so placed as that the zero of each scale shall coincide, (in respect of altitude or distance from the foot of the rod) with the highest reading on the other, such scales being of distinctive colors and design, substantially as shown, and adapted to, and for the purpose of, the taking of complementary readings by the leveler to prevent error, substantially as described and for the purpose hereinbefore set forth.

2. An engineer's leveling-rod having two distinctively-colored fixed and immovable graduated scales inverted with respect to each other, and so that the sum of the readings of the two scales at any one height on the rod will equal the whole length of the rod, substantially in the manner and for the purpose hereinbefore set forth.

3. A leveling-rod graduated on two of its faces (or sides) with fixed and immovable scales, inverted with respect to each other, substantially as shown, and for, and adapted to, the purpose of affording, direct to the leveler, complementary readings as an assurance against error, substantially as described and hereinbefore set forth.

June 18, 1897.

ARTHUR EDMUND BRETON HILL.

Witnesses:
 W. MYERS GRAY,
 JOHNSTONE GRAY.